United States Patent
Beyda et al.

[11] Patent Number: 6,021,120
[45] Date of Patent: Feb. 1, 2000

[54] SYSTEM AND METHOD FOR CREATING FULL DUPLEX VIRTUAL CIRCUITS BASED ON MULTIPLE ASYMMETRICAL LINKS

[75] Inventors: William J. Beyda, Cupertino; Shmuel Shaffer, Palo Alto, both of Calif.

[73] Assignee: Siemens Information and Communication Networks, Inc., Boca Raton, Fla.

[21] Appl. No.: 08/847,077

[22] Filed: Apr. 30, 1997

[51] Int. Cl.[7] ................................................ H04M 1/00
[52] U.S. Cl. .......................... 370/282; 370/468; 379/399
[58] Field of Search ................................... 370/276, 282, 370/283, 296, 272, 275, 468, 227, 228, 295; 379/399

[56] References Cited

U.S. PATENT DOCUMENTS

| | | | |
|---|---|---|---|
| 4,597,073 | 6/1986 | Staples | 370/24 |
| 4,882,726 | 11/1989 | Lang et al. | 370/24 |
| 5,394,392 | 2/1995 | Scott | 370/295 |
| 5,400,322 | 3/1995 | Hunt et al. | 370/17.19 |
| 5,408,260 | 4/1995 | Arnon | 348/6 |
| 5,457,555 | 10/1995 | Moriyama | 370/13 |
| 5,461,616 | 10/1995 | Suzuki | 370/79 |
| 5,495,483 | 2/1996 | Grube et al. | 370/95.1 |
| 5,533,008 | 7/1996 | Grube et al. | 370/17 |
| 5,579,305 | 11/1996 | Norrell et al. | 370/32.1 |
| 5,581,479 | 12/1996 | McLaughlin et al. | 364/514 A |
| 5,586,121 | 12/1996 | Moura et al. | 370/404 |
| 5,594,491 | 1/1997 | Hodge et al. | 378/7 |
| 5,596,604 | 1/1997 | Cioffi et al. | 345/260 |
| 5,604,682 | 2/1997 | McLaughlin et al. | 364/514 A |
| 5,608,725 | 3/1997 | Grube et al. | 370/338 |
| 5,612,742 | 3/1997 | Krause et al. | 348/385 |
| 5,613,190 | 3/1997 | Hylton | 455/3.1 |
| 5,715,237 | 2/1998 | Akiyoshi | 370/228 |
| 5,896,372 | 4/1999 | Auerbach et al. | 370/282 |

*Primary Examiner*—Hassan Kizou
*Assistant Examiner*—Hanh Nguyen

[57] ABSTRACT

A system and method for creating full duplex symmetrical circuits using asymmetrical links. Two asymmetrical channels 101a, 101b having high speeds in reverse directions are linked together in one full duplex symmetrical circuit 100 using a dedicated controller 122a to monitor the high speed channel bandwidth and to transmit control signals on the low speed channels in the opposite directions.

16 Claims, 5 Drawing Sheets

SYSTEM AND METHOD FOR CREATING FULL DUPLEX VIRTUAL CIRCUITS BASED ON MULTIPLE ASYMMETRICAL LINKS

BACKGROUND OF THE INVENTION

The present invention relates to telecommunication systems and, more particularly, to a telecommunication system in which full duplex symmetrical circuits are created based on multiple asymmetrical links.

Traditional data and digital telecommunication circuit applications often require a full duplex path. Such applications include, for example, video and multimedia applications for both business and home consumers. Recently, however, in response to the growth of the Internet, several asymmetrical telecommunication standards have emerged. A telecommunication configuration is symmetric if the channel bandwidth needed or provided is the same in both directions. Asymmetric or asymmetrical applications are those in which bandwidth requirements are higher in one direction than the other. Browsing the World Wide Web, for example, requires little bandwidth from the consumer to the content provider (on the order of kilobits per second). Only control information and billing data need to be provided. However, the bandwidth required from the content provider to the consumer is on the order of megabits per second.

One asymmetric configuration and standard which has developed is the asymmetrical digital subscriber line system (ADSL). The ADSL system offers T1 speeds and greater (6 megabits per second) in one direction but speeds less than 5% of T1 in the other direction. ADSL employs discrete multi-tone modulation (DMT) and permits a bandwidth of 6 megabits per second in one direction and 640 kilobits per second in the other. Another asymmetric technology are the X2 modems offered by U.S. Robotics, Inc., which provide 56 kilobits per second in one direction with less than half that in the other direction.

While often adequate for the home market and remote access telecommuting, such asymmetric technologies are limited in that they cannot offer symmetric high speed full duplex circuits. For some users, high speed symmetric circuits are required, as when a user needs to both upload and download full motion video data. However, asymmetrical technologies stand to make inroads into the modem and telecommunications markets because ADSL and X2 modem-type services are priced considerably less than comparable T1 lines, for example.

More particularly, a party needing to transmit digital data at high speeds in both directions typically must pay for symmetrical subscriber services such as T1 services, which typically cost several times what a single ADSL line costs. Similarly, a party such as a home office user needing bandwidth of 56 kbps would be required to pay higher costs for an ISDN line, for example, than for an X2 modem and service.

Accordingly, there is a need to provide high bandwidth telecommunication services to a home consumer or home telecommuter at competitive prices.

SUMMARY OF THE INVENTION

These and other drawbacks in the prior art are overcome in large part by a telecommunication system according to the present invention. More particularly, two asymmetrical channels having high speeds in reverse directions are linked together in one full duplex symmetrical circuit using a dedicated controller to monitor the high speed channel bandwidth and to transmit control signals on the low speed channels in the opposite directions.

Briefly, a node in the telecommunication system according to the present invention includes a first means for establishing a first asymmetrical link between the node and the second node. The first asymmetrical link transmits on a first path in a forward direction and receives on a second path in a reverse direction. The node further includes a second means for establishing a second asymmetrical link between the node and the second node. The second asymmetrical link transmits on a third path in the forward direction and receives on a fourth path in the reverse direction. Finally, the node includes a means for establishing a first symmetrical link transmitting on the first path and receiving on the fourth path.

A controller according to one embodiment of the present invention further includes circuitry for monitoring bandwidth usages on the high speed paths and accessing additional high speed paths when necessary to maintain high speed bandwidth.

BRIEF DESCRIPTION OF THE DRAWINGS

These and other aspects of the present invention will be readily understood with reference to the following specification and attached drawings wherein.

DETAILED DESCRIPTION OF THE INVENTION

Figure 1:
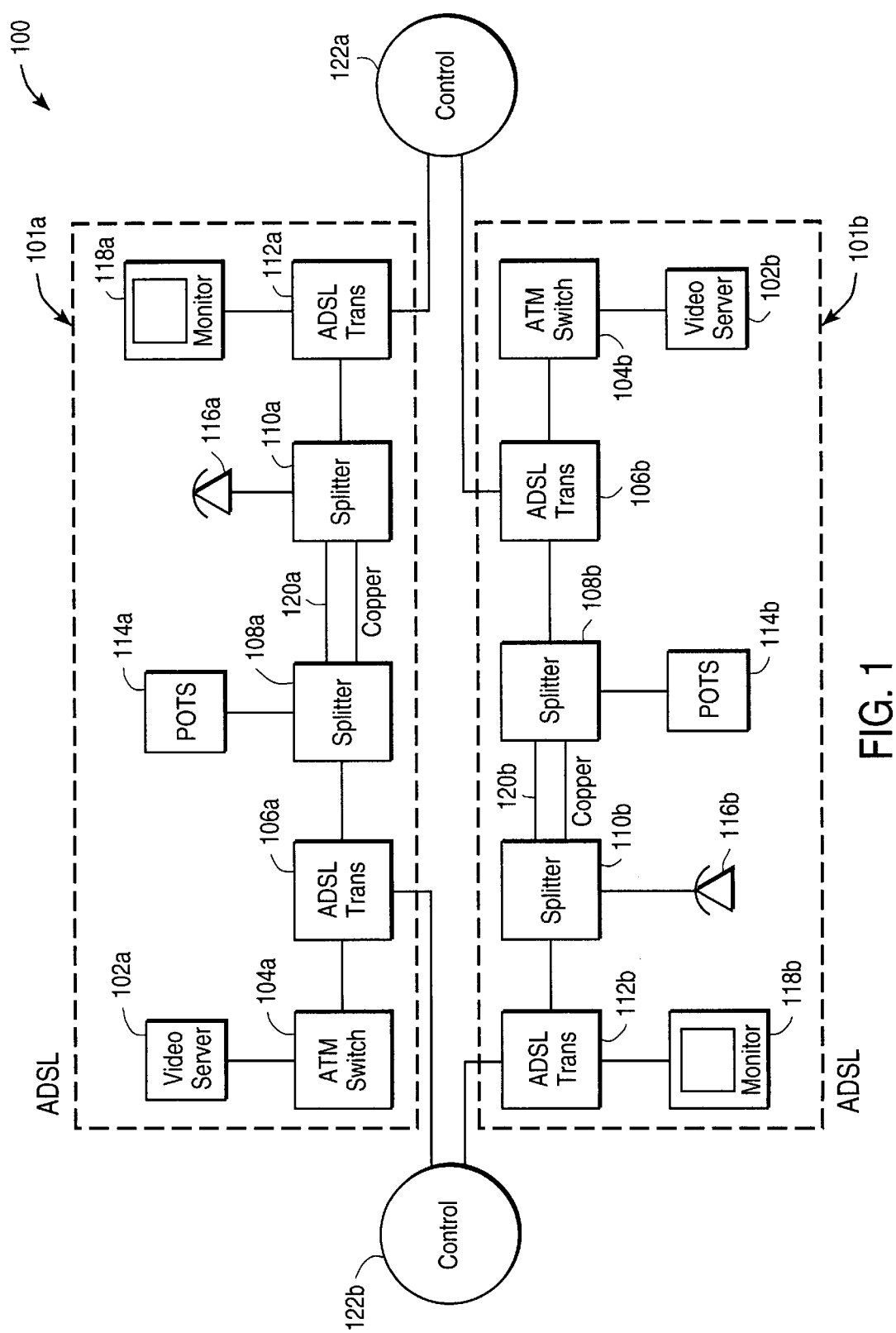
FIG. 1 is a block diagram of a telecommunications system according to one embodiment of the present invention.

Turning now to the drawings, and with particular attention to FIG. 1, a telecommunications system 100 according to an embodiment of the present invention is illustrated. The telecommunication system 100 includes first and second ADSL two-wire systems, 101a and 101b. It is noted that while illustrated as ADSL systems, any type of asymmetrical link, such as an asymmetrical modem or cable modem, may be used. Thus, FIG. 1 is exemplary only.

The ADSL two wire systems 101a, 101b are illustrated as being identical except that the ADSL systems 101a, 101b are oriented in opposite directions. Thus, each high speed channel goes in an opposite direction. The ADSL two wire system 101a includes a video server 102a which may be a camera or other video source. The ADSL two wire system 101a further includes an asynchronous transfer mode (ATM) switch 104a and ADSL transceiver 106a, a splitter 108a, a plain old telephone service (POTS) switch 114a, a twisted pair of copper wire telephone line 120a, a second splitter 110a, a telephone 116a, a second ADSL transceiver 112a and a television monitor 118a. The first and second ADSL transceivers 106a and 112a communicate control information to establish the link. Having exchanged this information a transmission can begin.

In operation, the video camera 102a will receive an image for teleconferencing and convert that image into digital information. The camera 102a routes the digital information to the ATM switch 104*a* which, in turn, routes the digital information to the ADSL transceiver 106*a*. The ADSL transceiver converts the digital information into a discrete multitone (DMT) symbol and conveys the DMT symbol to the other ADSL transceiver via the splitters 108*a*, 110*a* and the telephone line 120*a*. Upon receiving the DMT symbol the second ADSL transceiver 112*a* recaptures the digital information and routes the digital information to the TV monitor 118*a*.

In addition to transmitting high bandwidth digital information, the ADSL two wire system 101*a* can also support regular telephone communications or POTS. This is accomplished via the splitters 108*a* and 110*a*, which route low frequency or POTS signals to the telephone 116*a* or the POTS switch 114*a* while routing the higher frequency signals to the ADSL transceivers.

The ADSL transceivers 106*a*, 112*a*, determine the spectral response of the telephone line prior to executing any communication. This is accomplished by a first ADSL transceiver transmitting a wideband test signal to the second ADSL transceiver. Upon receipt, the second ADSL transceiver evaluates the received signal to determine the spectral response of the telephone line. Having the spectral response, the second ADSL transceiver generates a bit loading table and sends the bit loading table to the first ADSL transceiver. The bit loading table includes for each carrier channel a number of bits that the carrier channel can support. The high frequency range of the line is divided into 256 carrier channels separated by approximately 4 Khz. The first 32 carrier channels in the range from 20 Khz to 138 Khz are full duplex channels, while the 224 channels in the frequency range from 138 Khz to 1.1 megahertz are half duplex channels.

Once communication on ADSL two wire system 101*a* is accomplished, if two-way high speed communication is desired, control unit 122*b* provides a control signal or signals to ADSL transceiver 106*a*. ADSL transceiver 106*a* transmits the received control signal from controller 122*b* through splitter 108*a* across telephone line 120*a* to splitter 110*a* and then to ADSL transceiver 112*a*. ADSL transceiver 112*a* in turn provides the control signal to the control unit 122*a*. The control information includes information regarding, for example, which ADSL two line system should be used for the return channel and the source of the data which are to be transmitted at the T1 rates across the second ADSL two wire system 101*b*. Control units 122*a*, 122*b* may be, for example, microprocessors or microcontrollers such as those available from Motorola and Intel.

ADSL two wire system 101*b* performs in a manner similar to that for the ADSL two wire system 102*a*. ADSL transceiver 106*b* receives control signals from control unit 122*a* which establishes communication across telephone line 120*b*. The corresponding ADSL transceiver 112*b* receives the control signals which are provided to control unit 122*b*. Once the two asymmetrical channels are established, the lower speed channels are used between the controllers 122*a* and 122*b* to provide control information back and forth, as will be discussed in greater detail below. It is noted that setting up the symmetrical links can be accomplished either through the controller 122*a* transmitting control signals via the slow speed path of its reverse link 101*b*, or on the high speed portion of ADSL system 101*a*. In either case, the low speed channel from controller 122*b* initially causes the controller 122*a* to be ready for the symmetric transmission.

Figure 2:
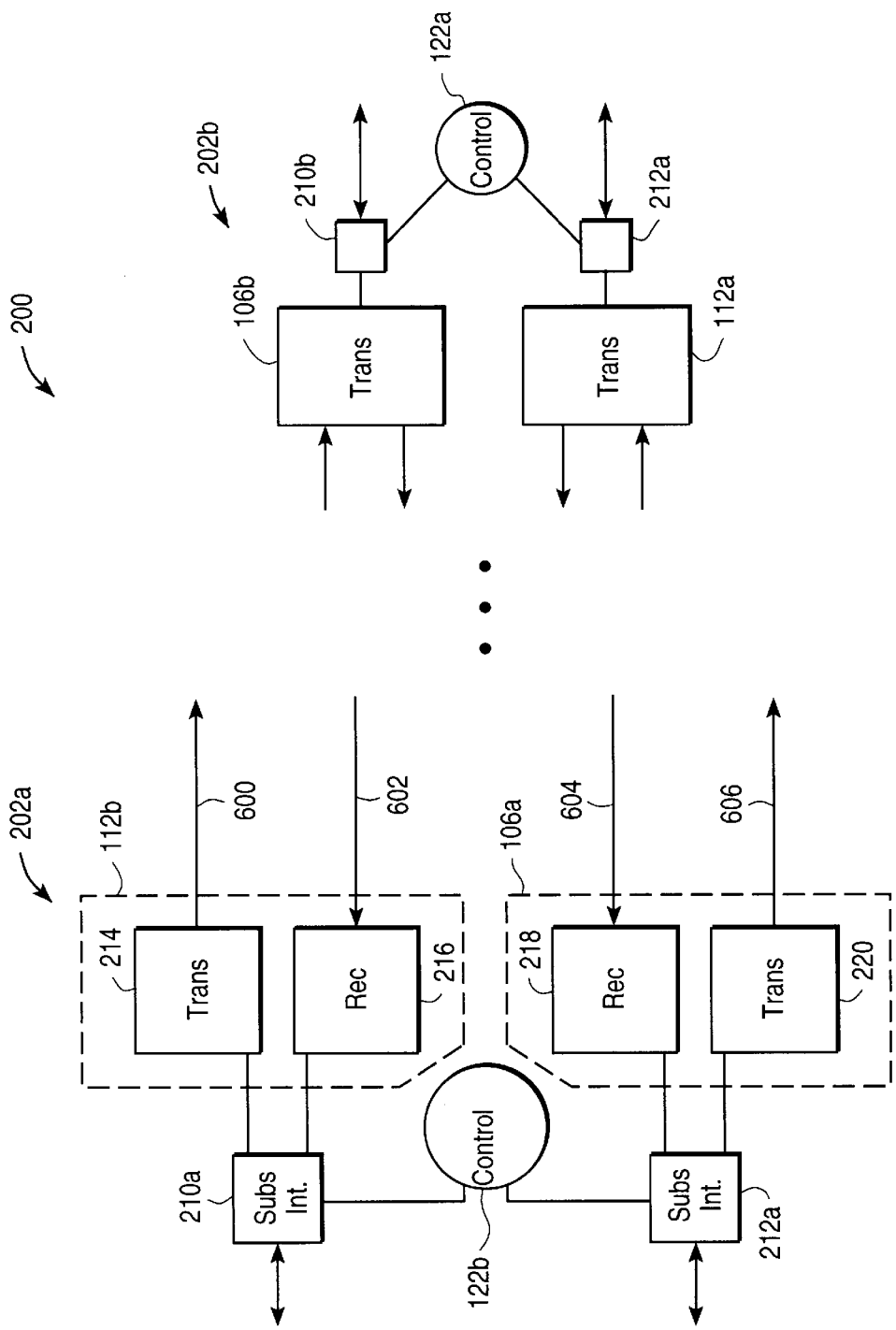
FIG. 2 is a block diagram illustrating in more detail a node of the telecommunications system illustrated in FIG. 1.

Turning now to FIG. 2, a diagram illustrating an exemplary symmetrical duplex circuit control node 202*a* is shown. For sake of convenience, the various splitters and other components shown in FIG. 1 are not included. Transceiver 112*b* includes a transmit portion 214 transmitting via low speed path 600 and a receive portion 216 receiving on a high speed path 602. Transceiver 112*b* is coupled to a subscriber interface 210*a*. Subscriber interface 210*a* includes, for example, interfaces to various T1 lines, an ADSL control channel and also possibly ISDN basic rate and high speed rate connections. Subscriber interface 210*a* is coupled to controller 122*b*. Controller 106*a* similarly coupled to a subscriber interface 212*a*. Subscriber interface 212*a* in turn is coupled to transceiver 106*a*, which includes a receiver unit 218 and a transmission unit 220. Transceiver 112*b* is configured to transmit at a transmitter 214 and receive at a higher rate at receiver 216. Similarly, transceiver 106*a* is configured to receive at a low rate at receiver 218 and transmit at a high rate at transmitter 220. As discussed above, communication is initiated upon reception of user data at a user interface 210*a*. ADSL control information may then be received at controller 122*b*. The ADSL control information can include information, for example as to whether a second ADSL two wire system should be employed during the communication, whether only one ADSL two wire system should be employed, or whether one ADSL system should be employed but the bandwidth usage of the slow rate channel or even the high rate channel should be monitored.

Controller 122*b* then causes certain control information to be passed along through transmitter 214. The high speed received information is received at receiver 216. The return path information at the high T1 rate may include control information instructing controller 122*b* to activate the second ADSL link. Alternatively, controller 122*a* may provide return control information to be received at receiver 218 of the transceiver 106*a*. This information is provided at the low path rate on path 604 and is also monitored by controller 122*b* at the subscriber interface 212*a*. If the signal is received from remote controller 122*a*, the controller 122*b* causes response data to be transmitted to the remote node 202*b* on the high speed path 606 via transmitter 220. Control unit 122*b* continues to provide control information from receiver 214 and receive control information from receiver 218.

If bandwidth usage or demand is about to exceed a predetermined limit on, for example, the corresponding high speed paths, the corresponding control unit sends control signals over the associated low speed paths to be received at the other controller. The controllers then cooperate to establish one or more new ADSL two wire links, if necessary.

Figure 3:
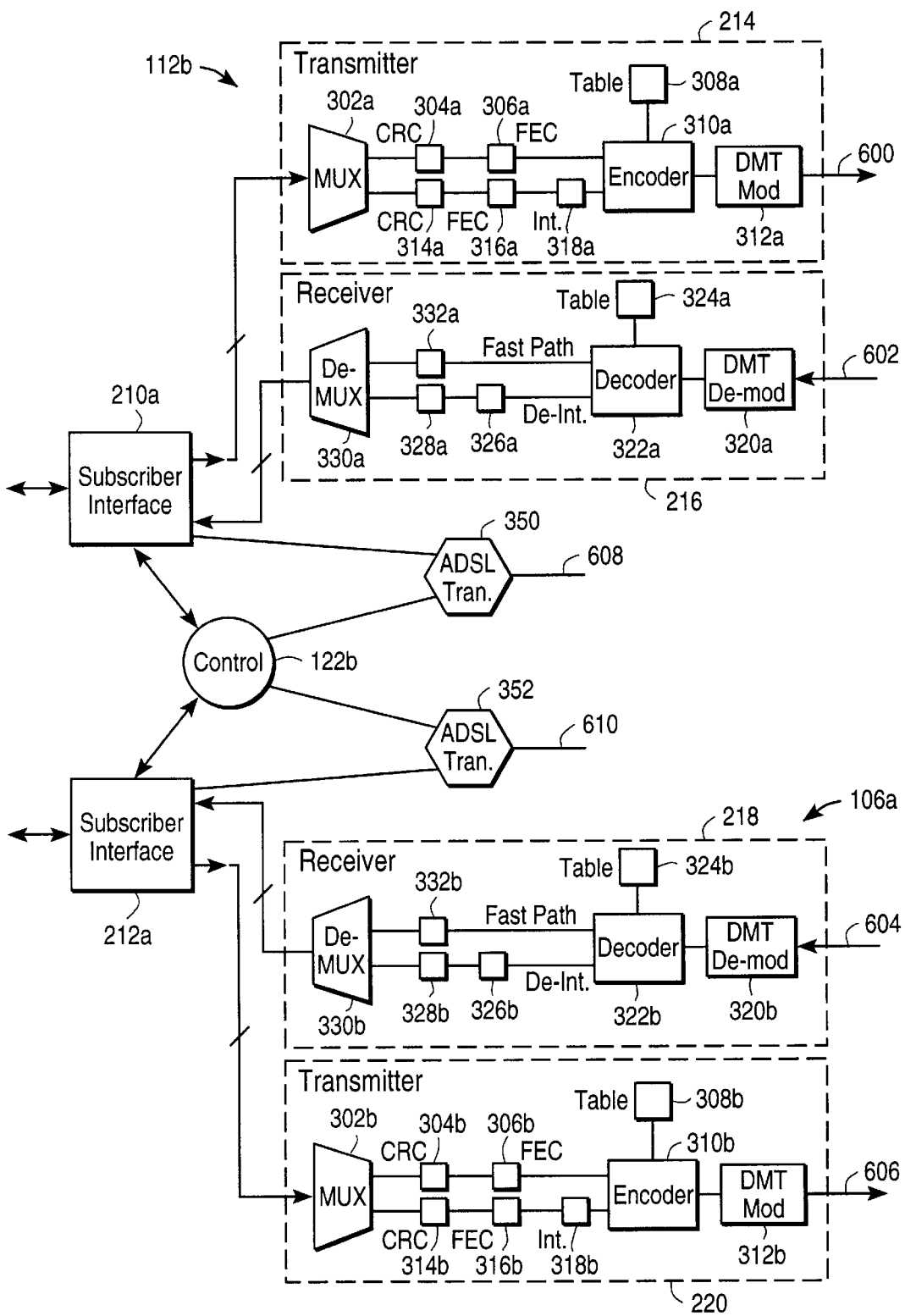
FIG. 3 is a more detailed block diagram showing the node of FIG. 2.

Transmitter 214, 220 and receivers 218 and 216 are illustrated in greater detail in FIG. 3. As shown, the ADSL transmitter 214 includes a multiplexer 302*a* which receives a plurality of inputs from subscriber interface 210*a*. As discussed above, the inputs include T1 links, ADSL control, and ISDN basic rate and high speed connections. Based on the ADSL control signal (and also, in some cases, in response to controller 122*b*), the multiplexer 302*a* provides one of the two inputs to a constellation encoder via a fast path or an interleave path. The fast path includes a scramble cyclic redundancy checksum (CRC) block which is coupled to a forward error correction (FEC) block 306*a*. The interleave path includes a scramble CRC 314*a*, a forward error correction block 316*a* and an interleave block 318*a*.

The path selected depends on the level of burst error correction needed. If less error correction is needed the fast path is selected; otherwise the interleave path is selected. The constellation encoder 310*a* encodes the received signals based on the bit loading table and then encoding sequence to produce an encoded data stream. The encoded data stream is then provided to the discrete multitone (DMT) modulator 312a which produces a DMT signal from the encoded data stream. The DMT symbol is then transmitted to the receiver of the other ADSL transceiver via the telephone line.

The receiver portion 218 of the ADSL transceiver includes a DMT modulator 320a which demodulates the DMT symbol to produce a demodulated signal. The demodulated signal is then provided to the constellation decoder 322a which decodes the signal based on bit loading information received from bit loading table 324a and a decoding sequence to recapture the transmitted data stream. The recaptured data stream is then provided to the demultiplexer 330a via a fast path or deinterleave path. The demultiplexer 330a then provides the recaptured data to the appropriate line whereupon it is provided to subscriber interface 210a.

Operation of transmitter 220 and receiver 218 coupled through user interface 212a is generally similar. It is noted that while illustrated as separate user interfaces, user or subscriber interfaces 210a and 212a may comprise a single unit. Thus, FIG. 3 is exemplary only. In addition to transmitters 214, 220 and the receivers 216 and 218, additional ADSL transceivers 350 and 352 may be provided which also may be coupled through the subscriber interfaces 210a, 212a and the control unit 122b. As will be discussed in greater detail below, transceivers 350 and 352 provide for extra bandwidth when needed.

Operation of an embodiment of the present invention is as follows: User information is received at user interface 210a. As noted above, such information includes, for example, ADSL control information and user data via, for example, T1 links, LAN connections or ISDN connections The control information is received by controller 122b. If the control information indicates that a standard asymmetric ADSL link is sufficient, controller 122b initiates operation of a standard ADSL channel as described above. However, controller 122b continues to monitor control information and bandwidth usage or demand received via the receiver 216 on path 602 from the remote unit (not shown). If the control unit 122b receives information indicating that bandwidth usage or demand is about to be exceeded or if control unit 122b receives control information via user interface 210 indicating that higher bandwidth is required, controller 122b operates to establish a full duplex symmetric circuit using ADSL transceiver 106a.

The controller 122b may accomplish this in a variety of ways. According to one embodiment, the controller 122b inserts a control element into the data that are being transmitted via the transmitter 214 on path 600 to the remote unit (not shown) The control element, when received by the remote unit, informs the remote unit that it should establish a secondary ADSL link (for purposes of illustration, this link is the one which couples via the transceiver 106a). The remote unit may provide an acknowledge signal either to be received on the receiver 216 via path 602 or on the receiver 218 via path 604. In either case, if the control acknowledgement is received, the controller 122b establishes the link using the transmitter 220 and path 606. The transmitter 220 is then used to transmit high speed data from the user to the remote site. The receiver 216 is used to receive high speed data from the remote site. The transmitter 214 and the receiver 218 are used to exchange control information via the local and remote nodes.

In an alternate embodiment, when the controller 122b determines either that bandwidth demand will be too high for a single asymmetric link, or it receives control information directing it to establish another ADSL link, controller 122b provides a control signal via the transmitter 220 which identifies both the prior link and possibly the bandwidth required on the new link. Again, the controller 122b may receive an acknowledge either via the receiver 218 or via the receiver 216. Once the acknowledgement has been established, the controller 122b cooperates with the remote controller 122a (not shown) to establish the symmetric links.

In either case, the controller 122b continues to monitor both links and if bandwidth usage is determined to exceed the requirements for either link in a manner similar to that discussed above, the controller 122b may cause the transceivers 350 and 352 to come into operation.

The control elements are illustrated in FIGS. 4a, 4b, 4c and 4d. Control element 400 is exemplary of a control element used by controller 122b to establish and/or control a symmetric link with the remote controller using the low speed transmission link 214. The control element 400 includes a symmetric channel block 402 which identifies or signifies the fact that establishment of a symmetric duplex circuit is required, or that the control element is for symmetric link purposes. Block 404 is an enable/disable control, used to indicate whether a particular link should be added, maintained, or dropped. Control element 400 further includes an identification block 406, which identifies in one embodiment the desired return channel. Control element 400 includes a protocol block 408 which may include any other desirable control data, such as whether channel performance is sufficient.

Figure 4A:
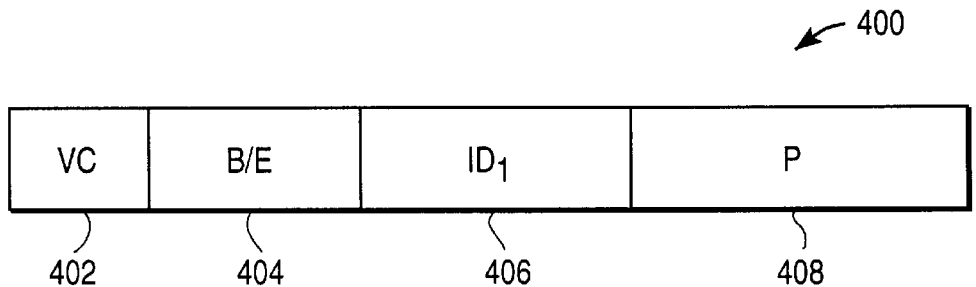
FIG. 4a, FIG. 4b, FIG. 4c, and FIG. 4d are diagrams illustrating control elements used according to an embodiment of the present invention.
Figure 4B:
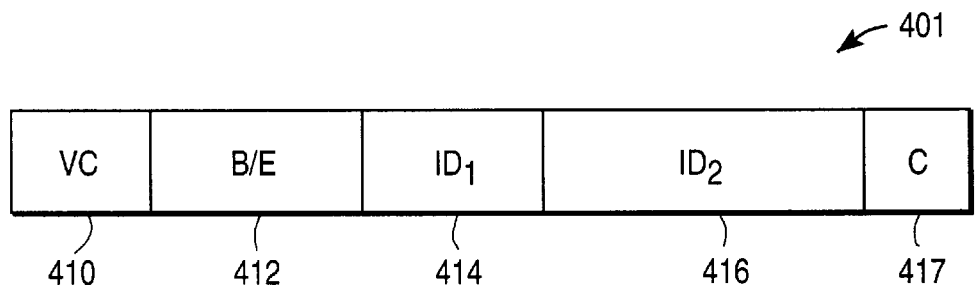

FIG. 4b illustrates a control element used by controller 122b via transmitter 220 to establish and/or control a symmetric duplex circuit with a currently active ADSL link. In this case, the control element 401 includes a symmetric channel block 410 to identify the fact that a symmetric channel in association with another link is desired. Element 401 further includes an enable/disable block 412 and identification blocks 414, 416 which identify the asymmetric links which are to be associated with one another to form the symmetric connection. Finally, additional control information may be provided via a block 417.

Figure 4C:
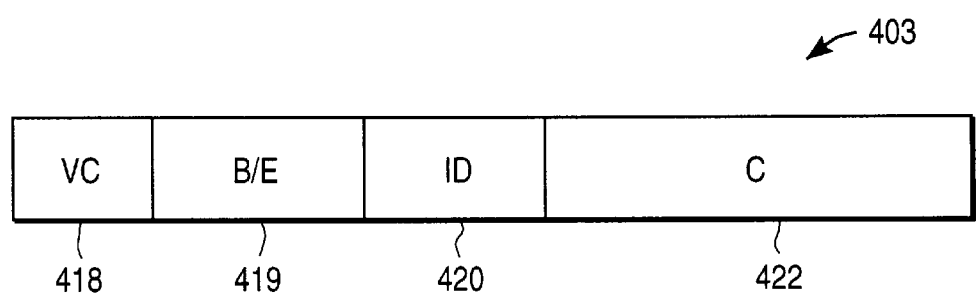

FIG. 4c illustrates a control element 403 which is used to respond to a request to establish and/or control a symmetric link, to be received at receiver 216. The protocol element 403 is returned along the receiver 216 in the case when the request was sent along transmitter 214. The protocol element 403 thus includes a symmetric channel control block 418 and an identification block 420. The identification block 420 identifies the corresponding reverse asymmetrical link which is to be established. In addition, control element 403 includes an enable/disable block 419 and an additional control block 422.

Figure 4D:
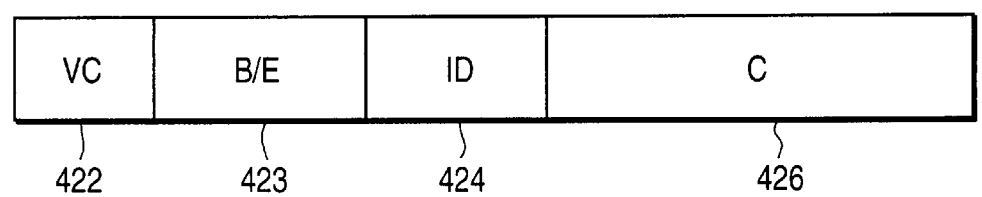

FIG. 4d illustrates the protocol element 405 which is used by the remote controller to respond to a request to establish and/or control a symmetric duplex circuit received at receiver 218. The protocol element is transmitted and received along receiver 218. Thus, protocol element 405 includes a symmetric channel block 422, an enable/disable block 423, an identification block 424, and a control block 426. The identification block 424 includes the identity of the corresponding asymmetric channel or channel(s). Additional control information is provided in a block 426.

Figure 5:
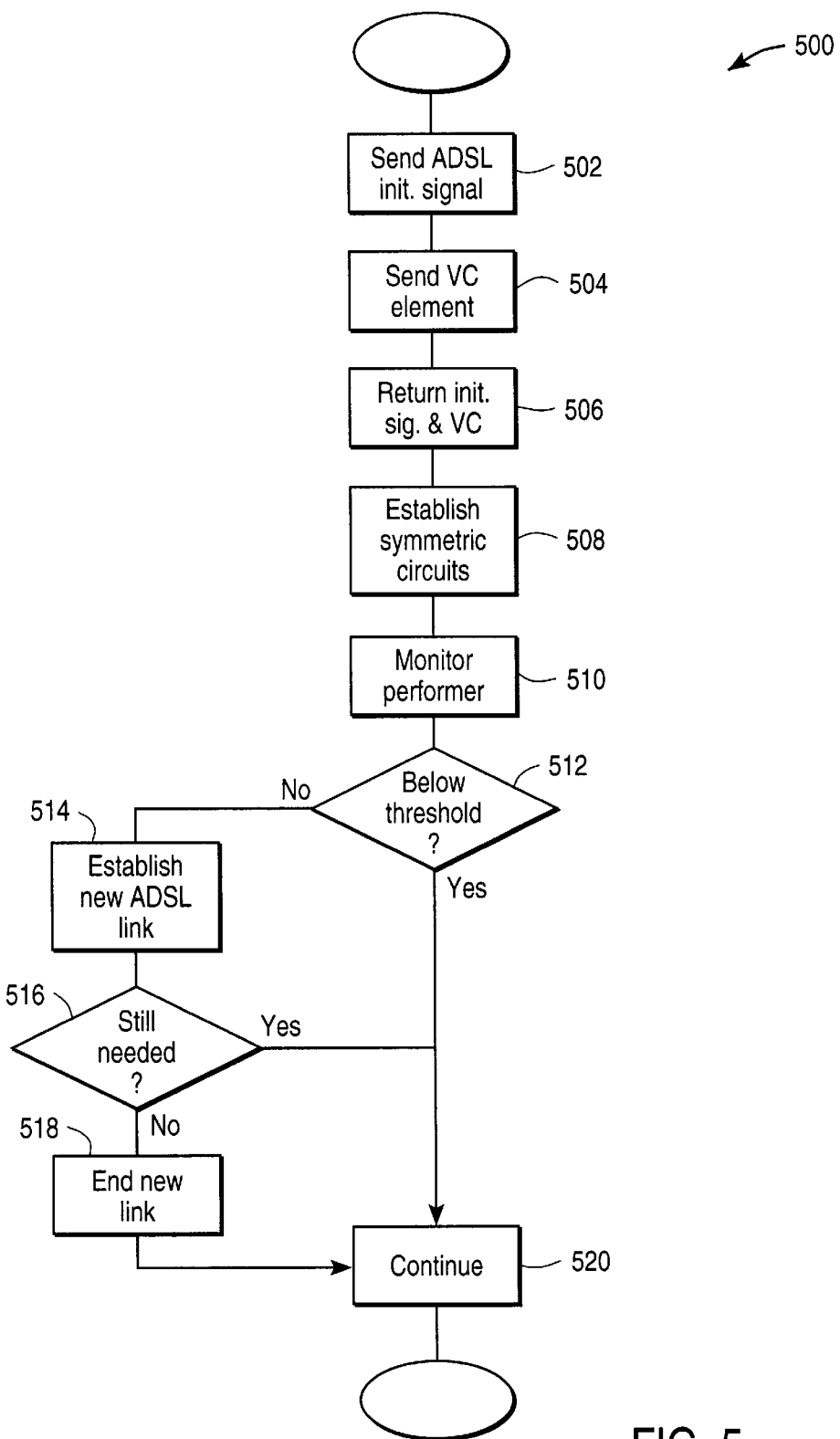
FIG. 5 is a flowchart illustrating operation of one embodiment of the present invention.

Turning now to FIG. 5, operation of one embodiment of the present invention is illustrated. An ADSL initialization signal is initially sent in a step 502. This includes, for example, control information such as receiver and bandwidth-required information. If the controller 122b determines or is instructed that a symmetric circuit is desired or required, the controller 122b sends a control element 400, 401 to the remote node in a step 504. The controller 122b may make such a determination based on monitoring network bandwidth demand, as will be discussed in greater detail below. As discussed above, this control element 400, 401 includes link identification information. The remote node returns an acknowledge control element 403, 405 in a step 506. As discussed above, this may include returning a control element 403 along the original asymmetric link or it may include returning a control element 405 along the asymmetric link which is desired to form the other end of the symmetric link.

Once the acknowledgement has been received by the control unit 122b, the appropriate symmetric circuits are established in a step 508. The controller 122b and the remote controller 122a continue to monitor demand of the asymmetric links in a step 510. More particularly, in a step 512, the controllers determine whether or not demand is below a predetermined threshold. For example, this may include determining whether or not bandwidth usage or demand exceeds a predetermined value. If the demand is below the predetermined threshold, transmission continues in a step 520. However, if demand is above the predetermined bandwidth threshold, then a new ADSL link is established in a step 514. The controller continues to monitor whether or not the new link is needed in a step 516. If not, the new link will be ended in a step 518. However, if the bandwidth provided by the extra ADSL link is required, the transmission will continue in step 520.

The invention described in the above detailed description is not intended to be limited to the specific form set forth herein but, on the contrary, it is intended to cover such alternatives, modifications, and equivalents as can be reasonably included within the spirit and scope of the appended claims.

What is claimed is:

1. A node in a telecommunications system, comprising:

first means for establishing a first asymmetrical link between said node and a second node, said first asymmetrical link configured for transmitting on a first path in a forward direction at a first maximum bandwidth level and receiving on a second path in a reverse direction at a second maximum bandwidth level different from said first maximum bandwidth level;

second means for establishing a second asymmetrical link between said node and a second node, said second asymmetrical link configured for transmitting on a third path in said forward direction at said second maximum bandwidth level and receiving on a fourth path in said reverse direction at said first maximum bandwidth level; and third means operatively coupled to said first means and said second means for establishing a first symmetrical link transmitting on said third path and receiving on said second path at said second maximum bandwidth level.

2. A node in a telecommunications system according to claim 1, said third means including means for monitoring bandwidth demand in said forward direction.

3. A node in a telecommunications system according to claim 2, wherein said third means is configured to establish said first symmetrical link responsive to a determination that a bandwidth demand in said forward direction exceeds a predetermined threshold.

4. A node in a telecommunications system according to claim 1, said third means including control means for establishing a symmetrical control link on said first path and said fourth path, said symmetrical control link configured to convey information used to control said first symmetrical link.

5. A node in a telecommunications system according to claim 4, said control means further including means for transmitting on a fifth path in said forward direction if said bandwidth demand in said forward direction exceeds a predetermined usage level.

6. A node in a telecommunications system according to claim 4, said control means including means for monitoring bandwidth demand information in said reverse direction.

7. A node in a telecommunications system according to claim 6, said control means including means for receiving on a sixth path in said reverse direction if said bandwidth demand information indicates that bandwidth demand in said reverse direction exceeds a predetermined threshold.

8. A method for communicating in a telecommunications system, comprising:

establishing a first asymmetrical link between said node and a second node, said first asymmetrical link configured for transmitting on a first path in a forward direction at a first maximum bandwidth level and receiving on a second path in a reverse direction at a second maximum bandwidth level different from said first maximum bandwidth level;

establishing a second asymmetrical link between said node and a second node, said second asymmetrical link configured for transmitting on a third path in said forward direction at said second maximum bandwidth level and receiving on a fourth path in said reverse direction at said first maximum bandwidth level; and establishing a first symmetrical link transmitting on said third path and receiving on said second path at said second maximum bandwidth level.

9. The method according to claim 8, further including monitoring bandwidth usage on said first path.

10. The method according to claim 9, including establishing said first symmetrical link responsive to a determination that a bandwidth usage on said first path exceeds a predetermined threshold.

11. The method according to claim 10, including establishing a symmetrical control link on said first path and said fourth path, said symmetrical control link configured to convey information used to control said first symmetrical link.

12. The method according to claim 11, further including transmitting on a fifth path in said forward direction if said bandwidth demand on said first path exceeds a predetermined demand level.

13. The method according to claim 11, including receiving bandwidth demand information in said reverse direction.

14. The method according to claim 13, including receiving on a sixth path in said reverse direction if said bandwidth usage information indicates that bandwidth usage on said second path exceeds a predetermined threshold.

15. A telecommunications system, comprising:

a first asymmetrical link coupling a first node and a second node, said first asymmetrical link having oppositely-oriented high and low bandwidth paths;

a second asymmetrical link coupling said first node and said second node, said second asymmetrical link having high and low bandwidth paths oriented in an opposite direction from said first asymmetrical link; and a control unit in said first node, said control unit configured to control said first asymmetrical link and said second asymmetrical link such that at least one symmetrical link having same bandwidth paths is maintained between said first node and said second node using oppositely oriented channels of said first asymmetrical link and said second asymmetrical link.

16. A telecommunications system as recited in claim 15, wherein said first and second asymmetrical links are analog links.

* * * * *